United States Patent [19]

Saito et al.

[11] Patent Number: 4,523,680

[45] Date of Patent: * Jun. 18, 1985

[54] TAPE CASSETTE STORAGE BOX COUPLING ACCESSORY

[75] Inventors: Shoichi Saito; Hideo Shirako, both of Tokyo, Japan

[73] Assignee: Olympus Optical Co., Ltd., Tokyo, Japan

[*] Notice: The portion of the term of this patent subsequent to Aug. 4, 1998 has been disclaimed.

[21] Appl. No.: 563,876

[22] Filed: Dec. 19, 1983

Related U.S. Application Data

[63] Continuation of Ser. No. 317,015, Nov. 2, 1981, abandoned.

[30] Foreign Application Priority Data

Nov. 11, 1980 [JP] Japan ............ 55-1690967[U]

[51] Int. Cl.³ .............. A47B 81/06; B65D 85/67
[52] U.S. Cl. .................. 206/387; 220/23.4; 312/9; 312/12
[58] Field of Search .............. 220/23.4, 23.8, 23.83; 215/10; 206/387, 444, 504, 509, 529, 821; 312/8, 12, 108, 111, 319, 342, 345, 349

[56] References Cited

U.S. PATENT DOCUMENTS

| D. 221,409 | 8/1971 | Gerber | 206/387 X |
|---|---|---|---|
| D. 234,066 | 1/1975 | Wallace | 206/387 X |
| 3,552,817 | 1/1971 | Marcolongo | 312/111 X |
| 3,756,383 | 9/1973 | Kryter | |
| 3,840,142 | 10/1974 | Tsukada | 220/23.4 |
| 3,856,369 | 12/1974 | Commiant | |
| 3,899,229 | 8/1975 | Ackeret | |
| 3,994,408 | 11/1976 | Belitzky | 215/10 |
| 4,026,615 | 5/1977 | Tazaki et al. | 312/12 |
| 4,040,518 | 8/1977 | Carter | 206/387 |
| 4,266,834 | 5/1981 | Ackeret | 206/387 X |
| 4,270,817 | 6/1981 | McRae | 206/387 X |
| 4,275,943 | 6/1981 | Gelardi et al. | 312/319 |
| 4,293,075 | 10/1981 | Veralrud | 206/387 X |
| 4,410,087 | 10/1983 | Shirako | 206/387 |
| 4,428,479 | 1/1984 | Shirako et al. | 206/387 |
| 4,431,237 | 2/1984 | Saito et al. | 206/387 X |

FOREIGN PATENT DOCUMENTS

| 502876 | 2/1976 | Australia . | |
| 0051848 | 5/1982 | European Pat. Off. | 206/387 |
| 0059429 | 9/1982 | European Pat. Off. | 206/387 |

OTHER PUBLICATIONS

Research Disclosure, No. 172, Aug. 1978; "A New Type of Cassettes Storage and Transportation System"; p. 41, report 17212.

Primary Examiner—Allan N. Shoap
Assistant Examiner—Bryon Gehman
Attorney, Agent, or Firm—Frishauf, Holtz, Goodman & Woodward

[57] ABSTRACT

This invention relates to a tape cassette storage box coupling accessory. The distance between first and second lateral faces of the tape cassette storage box coupling accessory is set so that the distance between one lateral face of a first tape cassette storage box and the other lateral face of a second tape cassette storage box is substantially equal to the longitudinal length of a compact tape cassette when a second engaging means of the other lateral face of the first tape cassette storage box and the first engaging means of the one lateral face of the second tape cassette storage box are engaged with the first engaging means of the first lateral face and the second engaging means of the second lateral face of the accessory, respectively.

6 Claims, 20 Drawing Figures

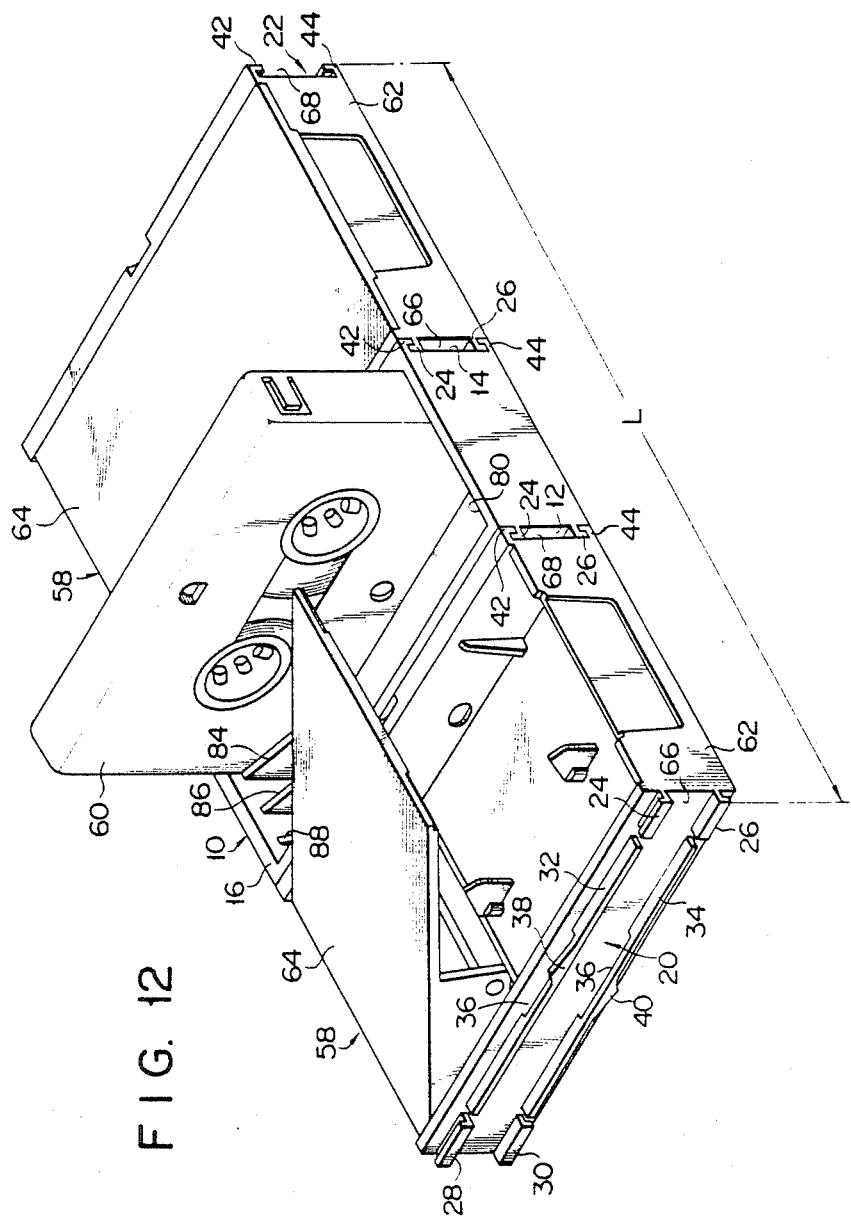

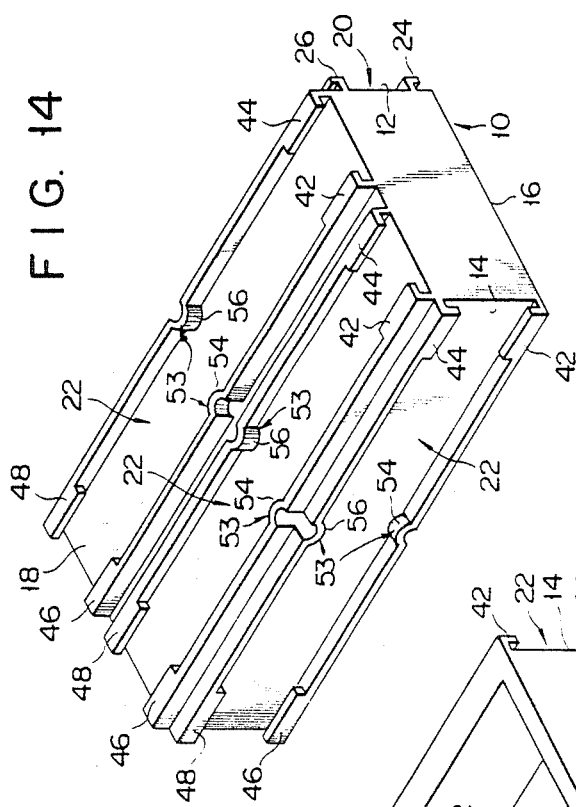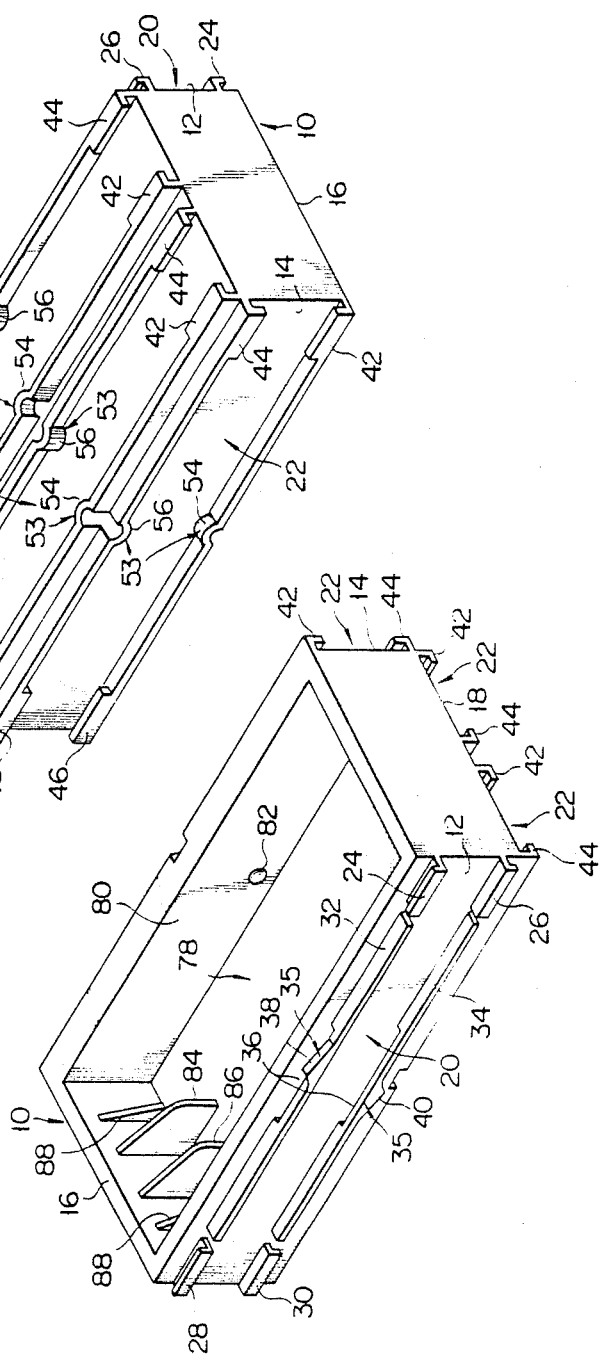

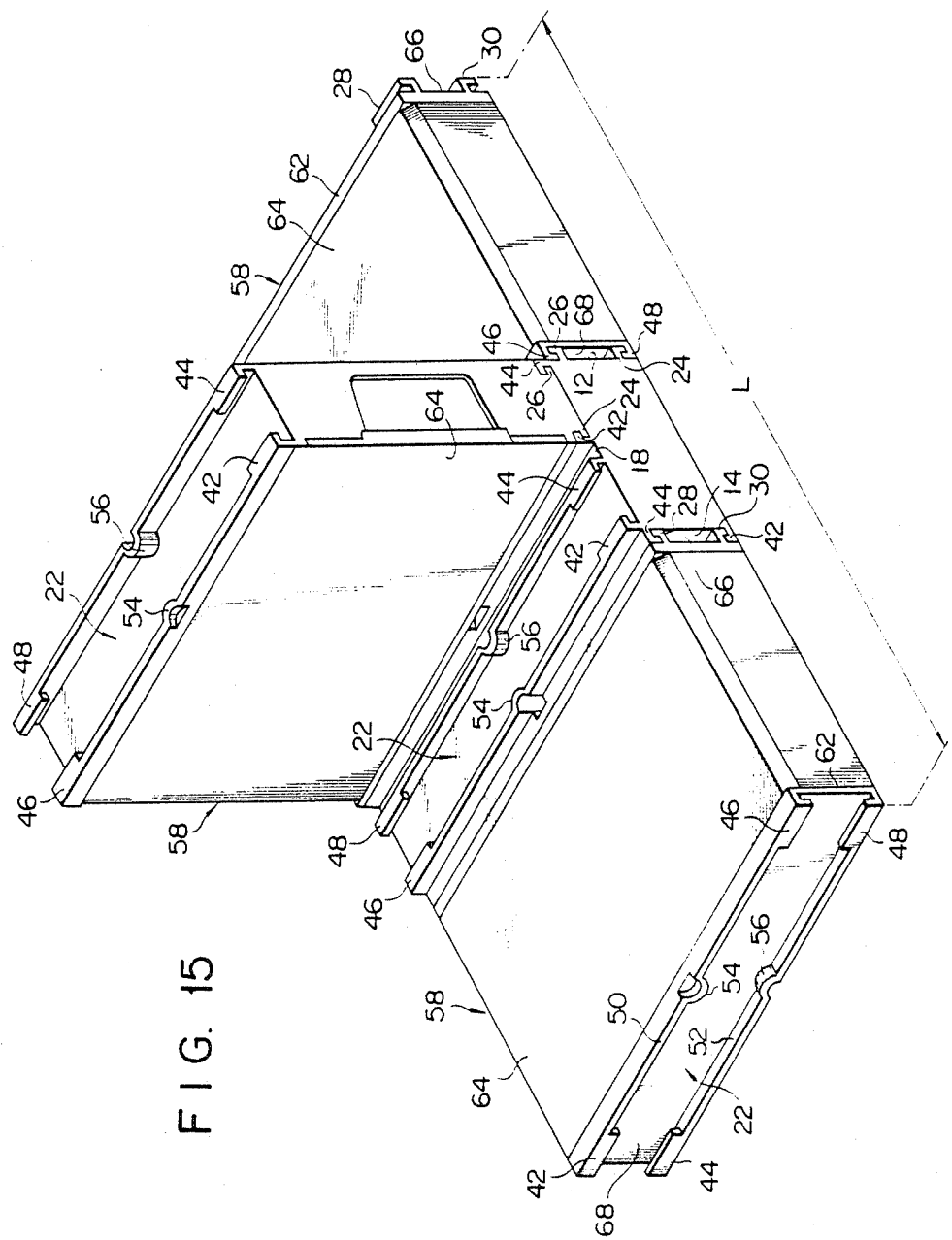

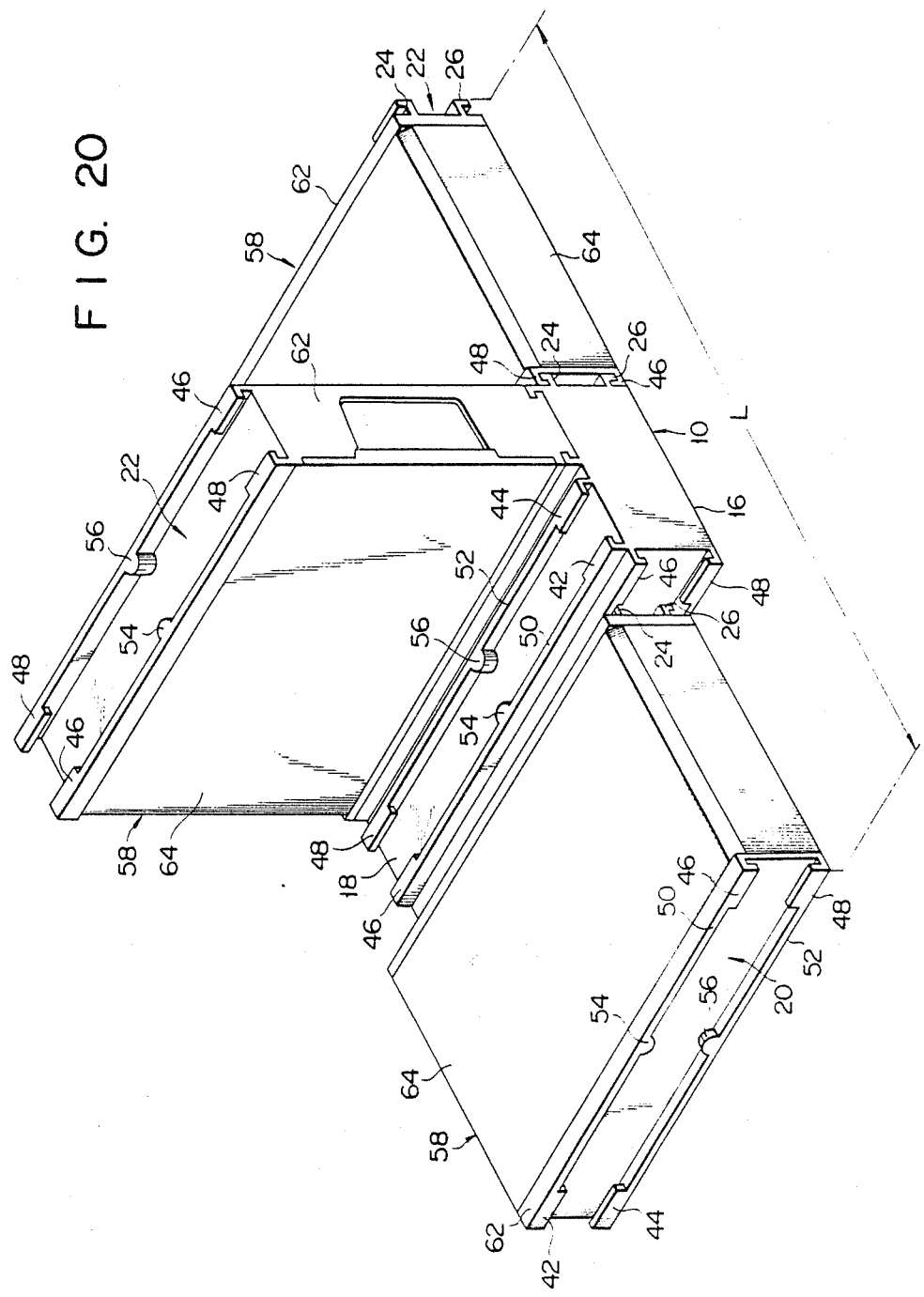

TAPE CASSETTE STORAGE BOX COUPLING ACCESSORY

This application is a continuation of application Ser. No. 317,015, filed Nov. 2, 1981, now abandoned.

BACKGROUND OF THE INVENTION

This invention relates to an accessory to be coupled with tape cassette storage boxes for storing tape cassettes called micro cassettes.

A prior art tape cassette storage box for micro cassette basically comprises a storage box body for holding a micro cassette, and a cover coupled with the storage box body so as to be able to rotate between first and second positions. In the first position, the cover houses the micro cassette held in the storage box body in cooperation therewith. In the second position, on the other hand, the cover allows the micro cassette to be removed from the storage box body.

Conventionally known are a wide variety of micro cassette storage boxes which are provided with various other components or members than the basic member consisting of the storage box body and the cover. One such conventional micro cassette storage box has first and second engaging members on one and the other of two lateral faces of the storage box body intersecting the axis of rotation of the cover. If we have two tape cassette storage boxes of such construction, we can engage the first engaging member of one of these storage boxes with the second engaging member of the other.

The external dimensions of the prior art micro cassette storage boxes are smaller than those of compact cassettes developed by Philips & Co. of the Netherlands. When displayed in stores for sale, therefore, these micro cassette storage boxes containing micro cassettes therein are less conspicuous than the compact cassettes, and can hardly attract consumers' attention. Thus, many of opportunities to sell the micro cassette storage boxes may be missed.

SUMMARY OF THE INVENTION

This invention is contrived in consideration of these circumstances, and is intended to provide a tape cassette storage box coupling accessory capable of making tape cassette storage boxes for micro cassettes more noticeable when they are displayed in stores for sale, thereby increasing opportunities to sell the micro cassette storage boxes, as well as micro cassettes contained therein.

BRIEF DESCRIPTION OF THE DRAWINGS

FIG. 12 is a perspective view showing a state in which the second engaging means of the first tape cassette storage box and the first engaging means of the second tape cassette storage box engage first and second engaging means of the second embodiment, respectively, and a micro cassette is held in the holding means of the second embodiment;

FIG. 13 is a top-side, perspective view showing a third embodiment of the invention including a holding means;

FIG. 14 is a bottom-side, perspective view of the third embodiment of FIG. 13 including two additional second engaging means;

FIG. 15 is a perspective view showing a state in which the second engaging means of the first tape cassette storage box, the first engaging means of the second tape cassette storage box, and a first engaging means of a third tape cassette storage box engage first and second engaging means and one of the two additional second engaging means of the third embodiment, respectively;

FIG. 20 is a perspective view showing a state in which the second engaging means of the first tape cassette storage box is coupled with the first engaging means on a first lateral face of the tape cassette storage box coupling accessory shown in FIG. 16, the first engaging means of the second tape cassette storage box is on the point of engaging the second engaging means on a second lateral face of the accessory shown in FIG. 17, and the first engaging means of the third tape cassette storage box is coupled with the second engaging means on a second horizontal face of the accessory shown in FIG. 17.

Figure 1:
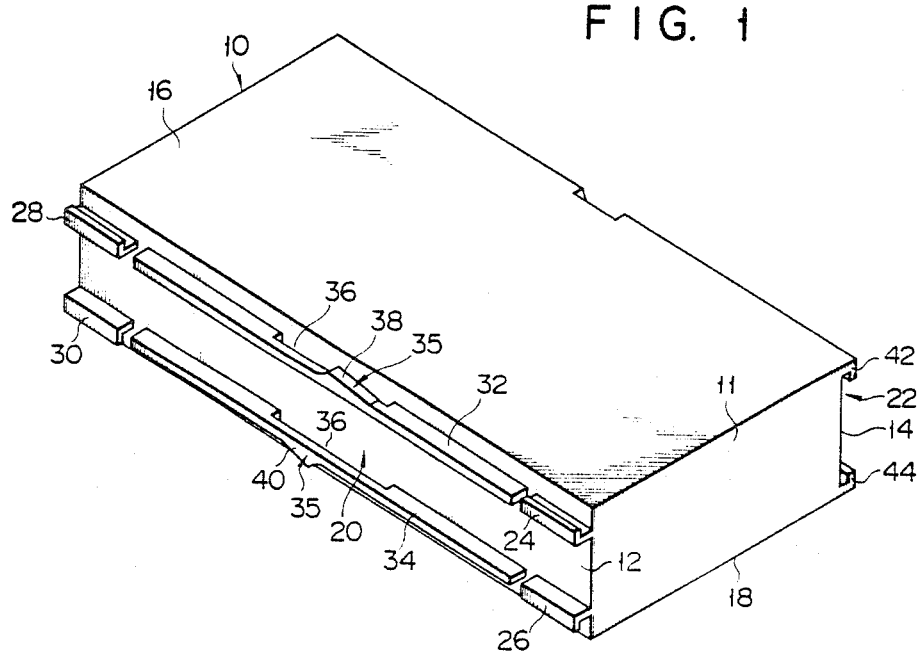
FIG. 1 is a perspective view showing a first embodiment of this invention.

Now there will be described the preferred embodiments of this invention with reference to the accompanying drawings.

DETAILED DESCRIPTION OF THE PREFERRED EMBODIMENTS

Referring now to the drawing of FIG. 1, there is shown a tape cassette storage box coupling accessory (hereinafter referred to simply as accessory) 10 according to a first embodiment of this invention which has an accessory body 11 in the shape of a rectangular parallelepiped. The accessory body 11 has first and second rectangular lateral faces 12 and 14 parallel with each other. Also, the accessory body 11 has first and second horizontal faces 16 and 18 adjoining the first and second lateral faces 12 and 14 at right angles thereto and extending in parallel with each other.

First and second engaging means 20 and 22 are formed on the first and second lateral faces 12 and 14, respectively.

In this embodiment, as shown in FIG. 1, the first engaging means 20 includes first to fourth engaging clicks 24, 26, 28 and 30 of a size formed in the vicinity of the four corners of the first lateral face 12.

The first and third engaging clicks 24 and 28 near the upper edge of the first lateral face 12 at the front and rear end portions thereof protrude substantially at right angles to the first lateral face 12, with their projected ends bent upward to extend in parallel with the first lateral face 12. Likewise, the second and fourth engaging clicks 26 and 30 near the lower edge of the first lateral face 12 at the front and rear end portions thereof protrude substantially at right angles to the first lateral face 12, with their projected ends bent downward to extend in parallel with the first lateral face 12.

The first engaging means 20 further includes a first guide plate 32 protruding from the first lateral face 12 substantially at right angles thereto and extending along an imaginary straight line connecting the first and third engaging clicks 24 and 28.

The front and rear ends of the first guide plate 32 are separated from the first and third engaging clicks 24 and 28, respectively.

The first engaging means 20 additionally includes a second guide plate 34 protruding from the first lateral face 12 substantially at right angles thereto and extending along an imaginary straight line connecting the second and fourth engaging clicks 26 and 30.

The front and rear ends of the second guide plate 34 are separated from the second and fourth engaging clicks 26 and 30, respectively.

The first and second guide plates 32 and 34 are arranged in parallel with each other.

The first and second guide plates 32 and 34 are each provided with an engaging device 35. The engaging device 35 has an opening 36 formed in the central portion of the first or second guide plate 32 or 34 between the front and rear ends thereof. Thus, the respective central regions of the first and second guide plates 32 and 34 are separated from the first lateral face 12. In this embodiment, the accessory body 11, the first to fourth engaging clicks 24, 26, 28 and 30, and the first and second guide plates 32 and 34 are integrally formed out of elastic plastic material by injection molding, so that the central regions of the first and second guide plates 32 and 34 can elastically be curved in the vertical direction along the first lateral face 12 of the accessory body 11.

As shown in FIG. 1, a first stopper 38 protrudes upward from the central portion of the top face of the first guide plate 32. The first stopper 38 is a little nearer to the front end of the first lateral face 12 than to the rear end. The top face of the first stopper 38 is formed of a gentle slope located on the front end side of the first lateral face 12 and ascenting slowly toward the rear end, and a concavely curved surface located on the rear end side and connecting the rear end of the gentle slope and the top face of the first guide plate 32.

Likewise, as shown in FIG. 1, a second stopper 40 protrudes downward from the central portion of the under surface of the second guide plate 34. The second stopper 40 is a little nearer to the rear end of the first lateral face 12 than to the front end. The under surface of the second stopper 40 is formed of a gentle slope located on the rear end side of the first lateral face 12 and descending slowly toward the front end, and a concavely curved surface located on the front end side and connecting the front end of the gentle slope and the under surface of the second guide plate 34.

Figure 2:
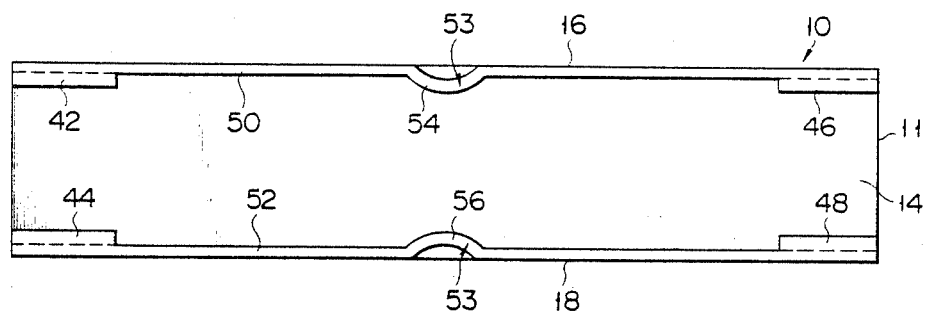
FIG. 2 is a side view showing the right-hand side of the first embodiment shown in FIG. 1.

In this embodiment, as shown in FIG. 2, the second engaging means 22 includes first to fourth engaged clicks 42, 44, 46 and 48 of a size formed in the four corners of the second lateral face 14.

The first and third engaged clicks 42 and 46 on the upper edge of the second lateral face 14 at the front and rear end portions thereof protrude substantially at right angles to the second lateral face 14, with their projected ends bent downward to extend in parallel with the second lateral face 14. Likewise, the second and fourth engaged clicks 44 and 48 on the lower edge of the second lateral face 14 at the front and rear end portions thereof protrude substantially at right angles to the second lateral face 14, with their projected ends bent upward to extend in parallel with the second lateral face 14.

The second engaging means 22 further includes a third guide plate 50 protruding from the second lateral face 14 substantially at right angles thereto and extending along an imaginary straight line connecting the first and third engaged clicks 42 and 46, that is, along the upper edge of the second lateral face 14.

The front and rear ends of the third guide plate 50 are coupled with the first and third engaged clicks 42 and 46, respectively.

The second engaging means 22 additionally includes a fourth guide plate 52 protruding from the second lateral face 14 substantially at right angles thereto and extending along an imaginary straight line connecting the second and fourth engaged clicks 44 and 48, that is, along the lower edge of the second lateral face 14.

The front and rear ends of the fourth guide plate 52 are coupled with the second and fourth engaged clicks 44 and 48, respectively.

The third and fourth guide plates 50 and 52 are arranged in parallel with each other. In third embodiment, the accessory body 11, the first to fourth engaged clicks 42, 44, 46 and 48, and the third and fourth guide plates 50 and 52 are integrally formed out of elastic plastic material by injection molding.

The third and fourth guide plates 50 and 52 are each provided with an engaged device 53.

The engaged device 53 of the third guide plate 50 has a first engaged projection 54 formed on the under surface thereof. The first engaged projection 54 protrudes downward from the middle portion of the third guide plate 50 between the front and rear ends of the second lateral face 14. The under surface of the first engaged projection 54 is formed of a convex surface. Formed in the top face of the third guide plate 50, as shown in FIG. 2, is a depression corresponding to the first engaged projection 54. The depression is defined by a bottom surface formed of a concave surface parallel with the under surface of the first engaged projection 54, thereby making the first engaged projection 54 hollow. Thus, the first engaged projection 54 can be elastically bent in the vertical direction along the second lateral face 14.

The engaged device 53 of the fourth guide plate 52 has a second engaged projection 56 formed on the top face thereof. The second engaged projection 56 protrudes upward from the middle portion of the fourth guide plate 52 between the front and rear ends of the second lateral face 14. The top face of the second engaged projection 56 is formed of a convex surface. Formed in the under surface of the fourth guide plate 52, as shown in FIG. 2, is a depression corresponding to the second engaged projection 56. The depression is defined by a bottom surface formed of a concave surface parallel with the top face of the second engaged projection 56, thereby making the second engaged projection 56 hollow. Thus, the second engaged projection 56 can be elastically bent in the vertical direction along the second lateral face 14.

Figure 3:
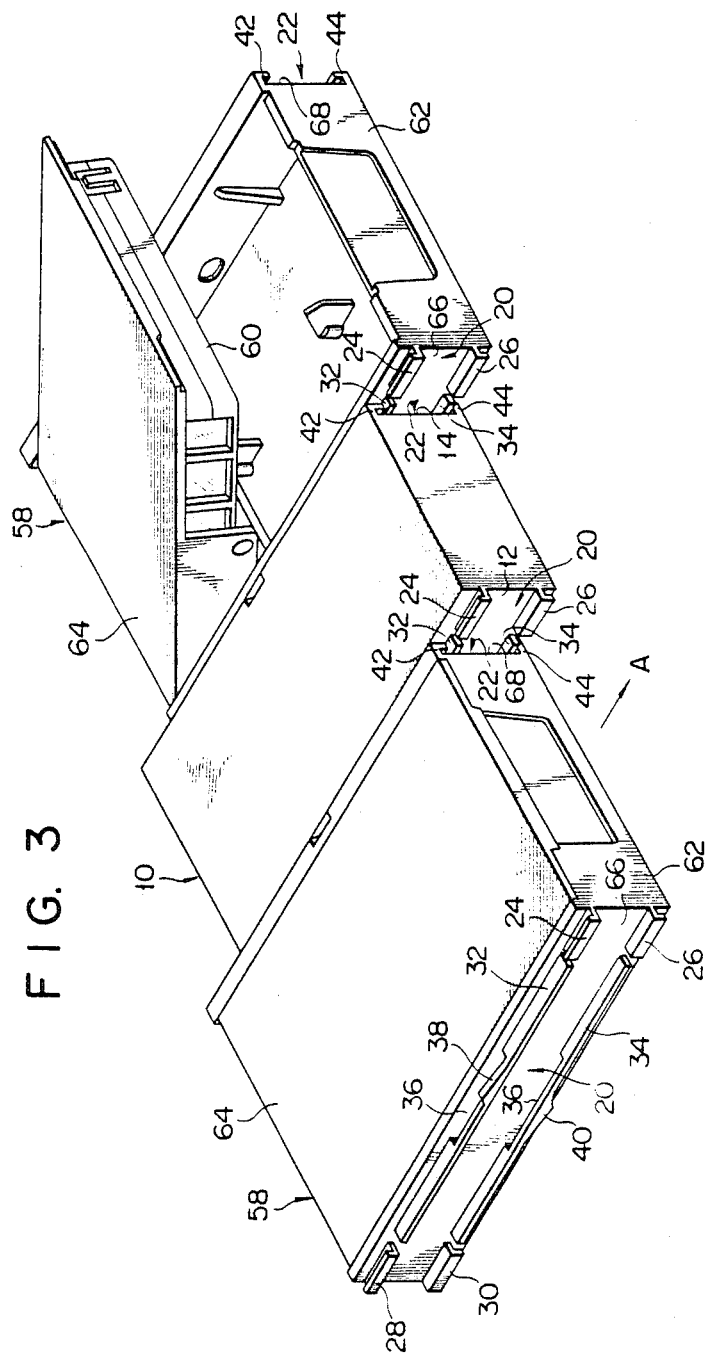
FIG. 3 is a perspective view showing a state immediately before a second engaging means of a first tape cassette storage box and a first engaging means of a second tape cassette storage box engage first and second engaging means of the first embodiment, respectively.

FIG. 3 shows two tape cassette storage boxes 58 of a size and of the same shape. Each of the tape cassette storage boxes 58 includes a storage box body 62 for holding a micro cassette 60, and a cover 64 coupled to the storage box body 62 so as to be able to rotate between first and second positions. In FIG. 3, the cover 64 of the left-hand tape cassette storage box 58 is located in the first position. In cooperation with the storage box body 62, the cover 64 in the first position houses a micro cassette. In FIG. 3, moreover, the cover 64 of the right-hand tape cassette storage box 58 is located in the second position. The cover 64 in the second position allows the micro cassette 60 to be removed from the storage box body 62. In this embodiment, the cover 64 has a kangaroo pocket. Thus, the micro cassette 60 moves together with the cover 64 between the first and second positions.

In each of the tape cassette storage boxes 58, the same first and second engaging means 20 and 22 of the accessory 10 are formed on left- and right-hand side faces 66 and 68 of the storage box body 62 which intersect the axis of rotation of the cover 64, respectively.

As shown in FIG. 1, thereupon, the right-hand lateral face of the left one of the two tape cassette storage boxes 58 is opposed to the first lateral face 12 of the accessory 10, and the first engaged click 42 of the second engaging means 22 of the storage box 58 is set on the top face of the first guide plate 32 of the accessory 10 just behind the first engaging click 24 thereof, as shown in FIG. 3. At the same time, the second engaged click 44 is set on the under surface of the second guide plate 34 of the accessory 10 just behind the second engaging click 26 thereof. Then, the left-hand storage box 58 is moved along the longitudinal direction of the first lateral face 12 of the accessory 10 toward the front end of the accessory 10, as indicated by an arrow A of FIG. 3. Thereupon, the first engaged click 42 of the second engaging means 22 of the left-hand storage box 58 slides along the top face of the first guide plate 32 of the accessory 10, while the second engaged click 44 of the second engaging means 22 of the storage box 58 slides along the under surface of the second guide plate 34 of the accessory 10. Thus, the left-hand tape cassette storage box 58 is guided in its movement relative to the accessory 10.

Then, the top face of the second engaged projection 56 of the second engaging means 22 of the moved tape cassette storage box 58 abuts against the gently sloping under surface of the second stopper 40 of the first engaging means 20 of the accessory 10, thereby curving the second stopper 40 upward. At the same time, the respective projected end portions of the first to fourth engaged clicks 42, 44, 46 and 48 of the second engaging means 22 of the left-hand storage box 58 get engaged with the respective projected end portions of the first to fourth engaging clicks 24, 26, 28 and 30 of the first engaging means 20 of the accessory 10.

Figure 4:
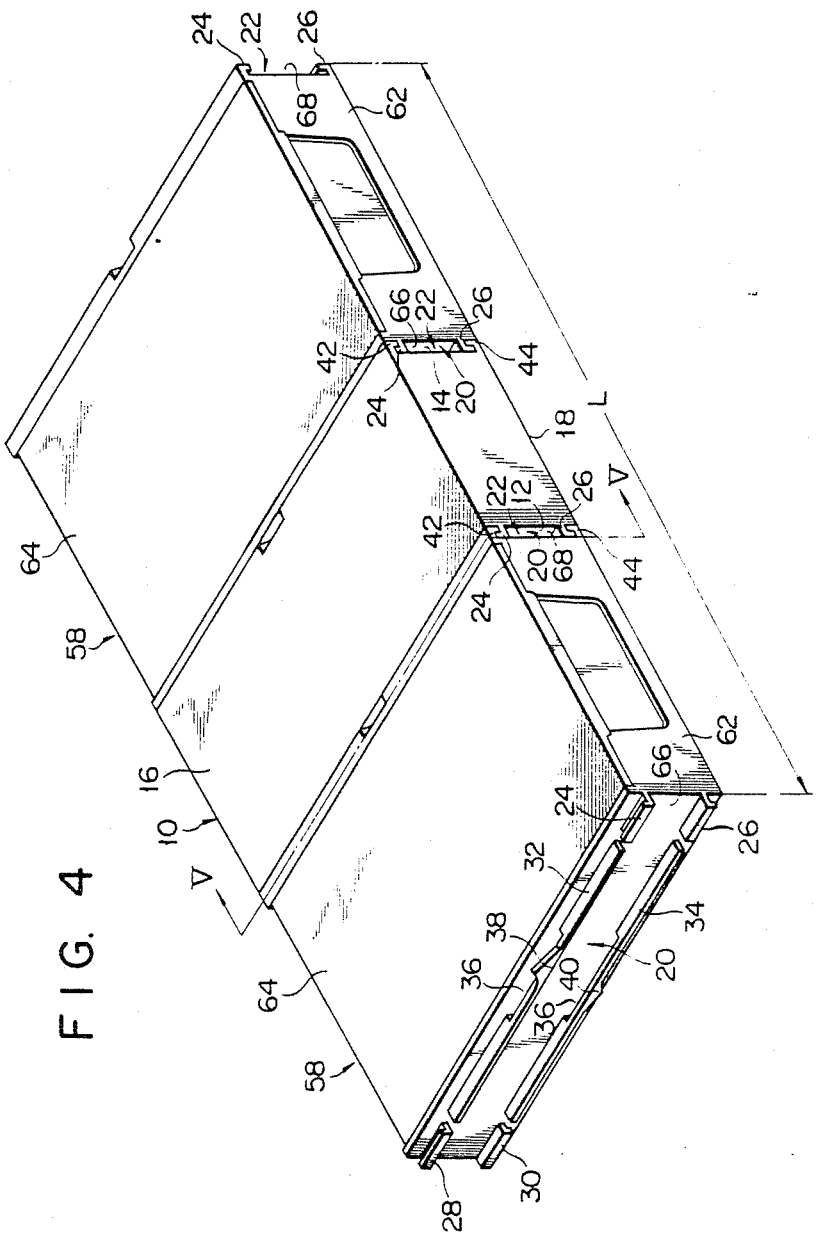
FIG. 4 is a perspective view showing a state after the second engaging means of the first tape cassette storage box and the first engaging means of the second tape cassette storage box has engaged the first and second engaging means of the first embodiment, respectively.
Figure 5:
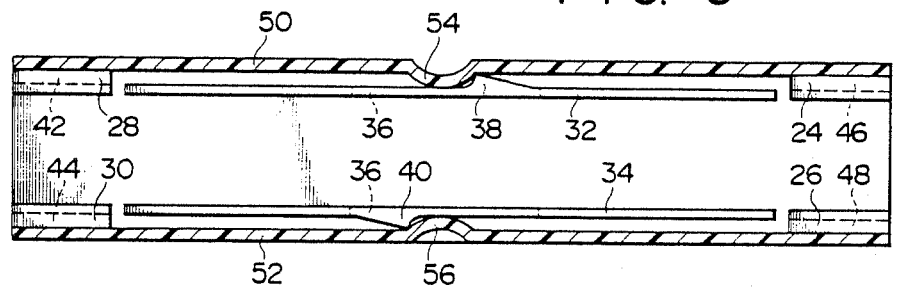
FIG. 5 is a sectional view taken along line V—V of FIG. 4.

When the front end face of the left-hand storage box 58 becomes flush with the front end face of the accessory 10, as shown in FIG. 4, the first and second engaged projections 54 and 56 of the second engaging means 22 of the left-hand storage box 58 abut against the curved surfaces of the first and second stoppers 38 and 40 of the first engaging means 20 of the accessory 10, respectively, as shown in FIG. 5. Thus, as shown in FIG. 4, the left-hand tape cassette storage box 58 and the accessory 10 are coupled with each other, with their respective front and rear end faces located within the same planes, as shown in FIG. 4.

Also, the first to fourth engaging clicks 24, 26, 28 and 30 of the first engaging means 20 of the right-hand tape cassette storage box 58 shown in FIG. 3 can be caused to engage the first to fourth engaged clicks 42, 44, 46 and 48 of the second engaging means 22 of the accessory 10, respectively, as shown in FIG. 4.

Figure 6:
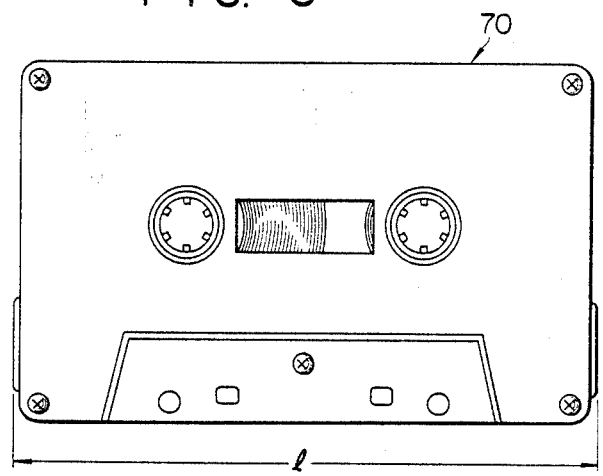
FIG. 6 is a plan view of a compact cassette.

The distance L between the left-hand lateral face 66 of the left-hand tape cassette storage box 58 and the right-hand lateral face 68 of the right-hand tape cassette storage box 58 coupled with the accessory 10, as shown in FIG. 4, is substantially equal to the longitudinal length l of a compact cassette 70 shown in FIG. 6, that is, approximately 102 mm.

As shown in FIG. 4, the upper surface or the first horizontal face 16 and the lower surface or the second horizontal face 18 of the accessory body 11 are arranged flush with the respective upper and lower surfaces of the two tape cassette storage boxes 58 coupled with the accessory 10, respectively.

When an external force exceeding a given level is applied to each of the two tape cassette storage boxes 58 coupled with the accessory 10 as shown in FIG. 4, the first or second engaged projection 54 or 56 of the engaged device 53 of the second engaging means 22 elastically deforms the first or second stopper 38 or 40 of the engaging device 35 of the first engaging means 20 in the downward or upward direction. Then, the engagement between the engaging device 35 of the first engaging means 20 and the engaged device 53 of the second engaging means 22 is removed to allow the two tape cassette storage boxes 58 to be moved along the first and second lateral faces 12 and 14 of the accessory 10 in the longitudinal direction thereof. Thus, each of the two tape cassette storage boxes 58 moved relatively to the accessory 10 in the longitudinal direction thereof can be released from the coupling with the accessory 10, as shown in FIG. 3, after going through the aforesaid processes inversely.

Figure 7:
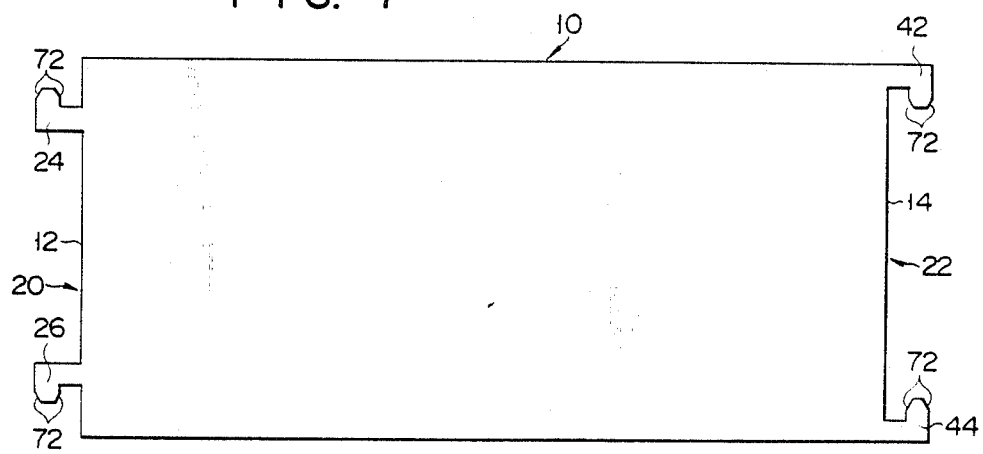
FIG. 7 is an enlarged front view showing the front end face of the first embodiment.

In this embodiment, as shown in FIG. 7, a pair of chamfer portions 72 are formed at the projected edge of each of the first to fourth engaging clicks 24, 26, 28 and 30 of the first engaging means 20 and the first to fourth engaged clicks 42, 44, 46 and 48 of the second engaging means 22 along the longitudinal direction or the engaging direction thereof.

Figure 8:
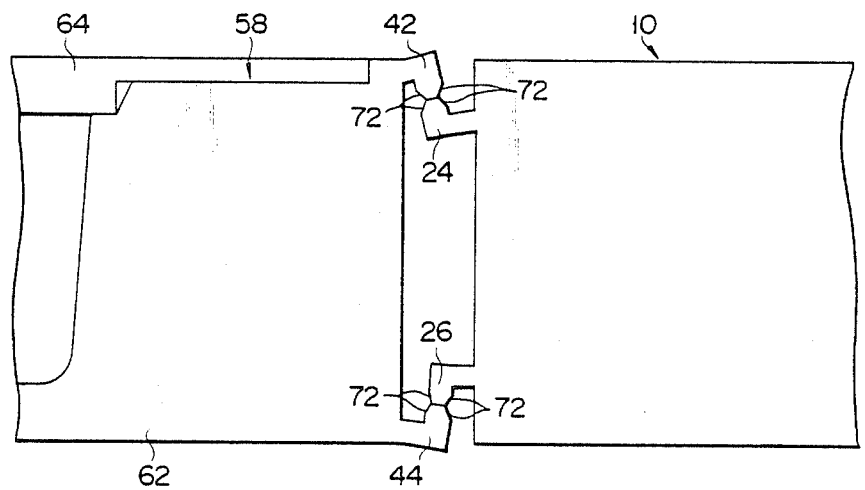
FIG. 8 is an enlarged front view showing a state immediately before the first engaging means of the first embodiment of FIG. 1 and the second engaging means of the tape cassette storage box of FIG. 3 are forced to engage each other.

Accordingly, when the left-hand tape cassette storage box 58 and the accessory 10 are pressed to each other with the chamfer portions 72 of the first to fourth engaging clicks 24, 26, 28 and 30 of the first engaging means 20 of the accessory 10 held against the chamfer portions 72 of the first to fourth engaged clicks 42, 44, 46 and 48 of the second engaging means 22 of the tape cassette storage box 58, the first and second engaged clicks 42 and 44 are elastically curved so as to be separated from each other, as shown in FIG. 8. At the same time, as shown in FIG. 8, the first and second engaging clicks 24 and 26 are elastically curved so as to approach each other. At the same time, moreover, the third and fourth engaged clicks 46 and 48 are elastically curved so as to be separated from each other, while the third and fourth engaged clicks 28 and 30 are elastically curved so as to approach each other.

Figure 9:
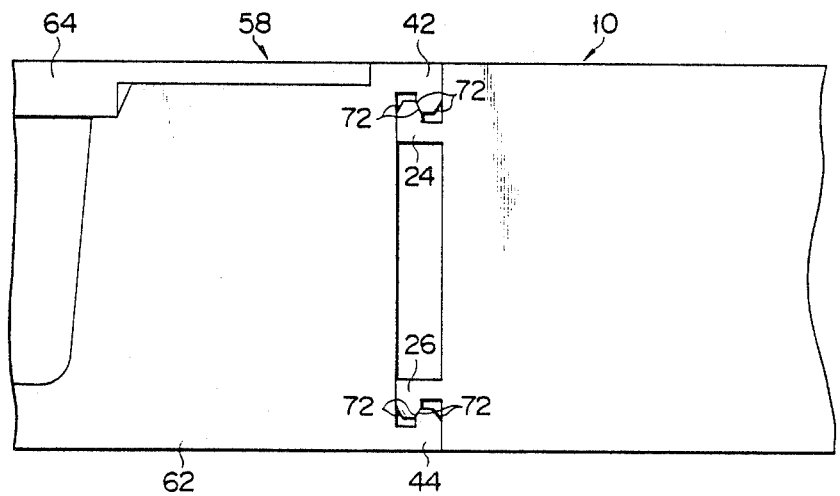
FIG. 9 is an enlarged front view showing a state after the first engaging means of the first embodiment of FIG. 8 and the second engaging means of the tape cassette storage box of FIG. 8 are forced to engage each other.

When the distance between the accessory 10 and the left-hand tape cassette storage box 58 is narrowed further, the first to fourth engaged clicks 42, 44, 46 and 48 of the second engaging means 22 of the storage box 58 get engaged with the first to fourth engaging clicks 24, 26, 28 and 30 of the first engaging means 20 of the accessory 10, respectively, as shown in FIG. 9. Thus, the left-hand tape cassette storage box 58 and the accessory 10 are coupled with each other.

At this time, the chamfer portions 72 of the first to fourth engaged clicks 42, 44, 46 and 48 of the second engaging means 22 of the left-hand tape cassette storage box 58 are in contact with the chamfer portions 72 of the first to fourth engaging clicks 24, 26, 28 and 30 of the first engaging means 20 of the accessory 10, as shown in FIG. 9.

The accessory 10 and the left-hand tape cassette storage box 58 are released from the aforesaid coupling when they are moved away from each other, following the processes shown in FIGS. 9 and 8 in order.

Figure 10:
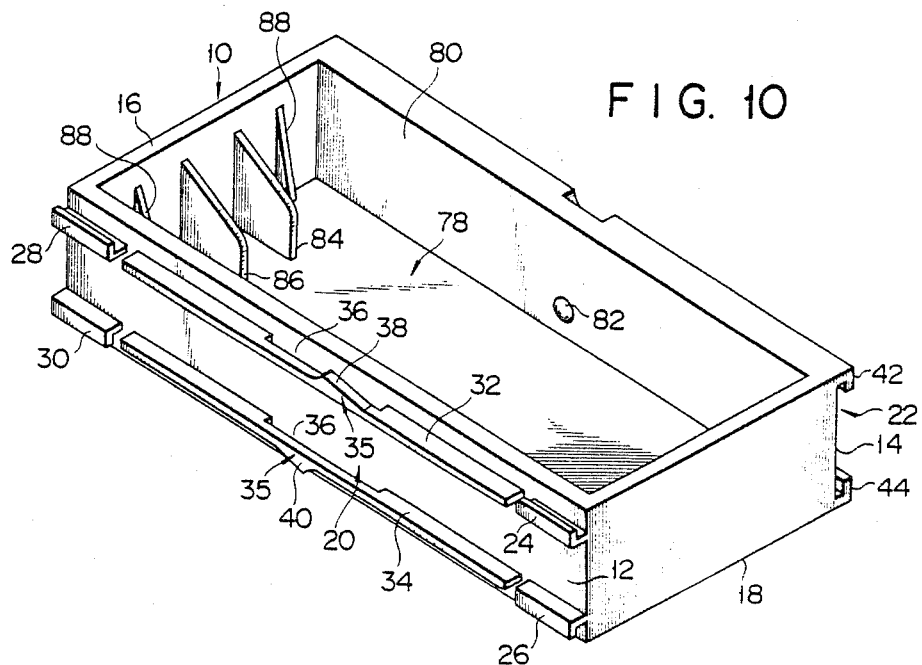
FIG. 10 is a perspective view showing a second embodiment of the invention including a holding means.
Figure 11:
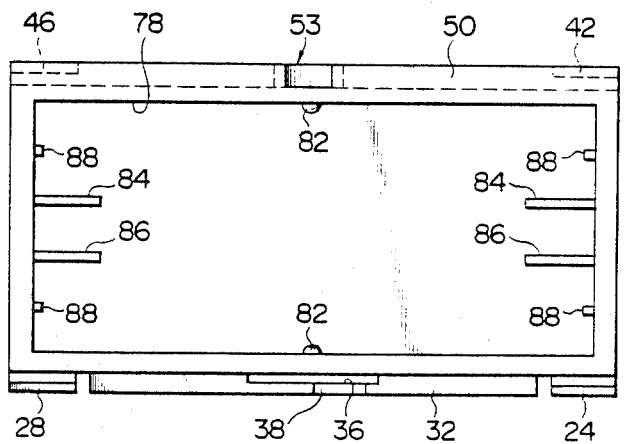
FIG. 11 is a plan view of the second embodiment shown in FIG. 10.
Figure 17:
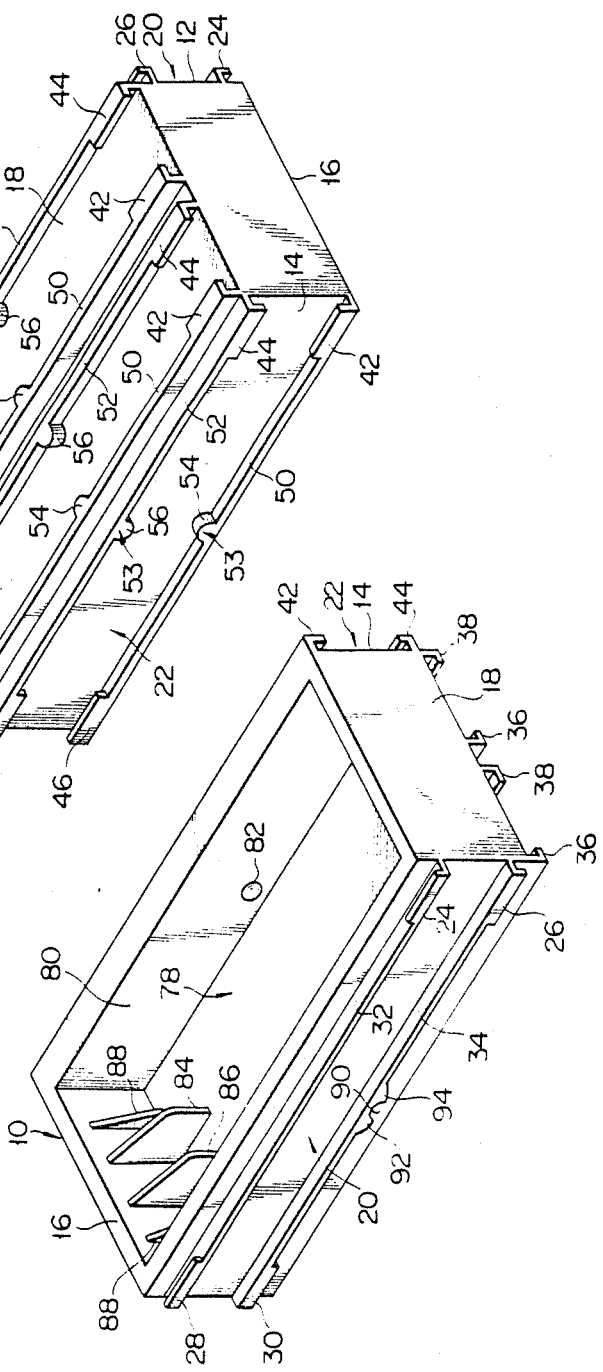
FIG. 17 is a perspective view showing another example of the second engaging means corresponding to the first engaging means of FIG. 16.

Referring now to FIGS. 10 to 12, there will be described a second embodiment of the invention. In the description to follow, like reference numerals used in the above description in conjunction with the first embodiment refer to like portions throughout the drawings. As shown in FIG. 10, an accessory 10 according to the second embodiment has a holding means 78 defined in a first horizontal face 16.

The holding means 78 includes a cavity defined by an inner peripheral surface 80. As shown in FIG. 11, a first small projection 82 is formed on each of the two opposite lateral face portions of the inner peripheral surface 80, while first and second partition walls 84 and 86 are formed on each of the opposite front and rear end face portions of the surface 80. On each end face portion of the inner peripheral surface 80, moreover, two second small projections 88 are formed between one lateral face portion and the first partition wall 84 and between the other lateral face portion and the second partition wall 86, severally.

When a micro cassette 60 taken out of a tape cassette storage box 58 is inserted in the cavity of the holding means 78, as shown in FIG. 12, it is held between one of the first small projections 82, a pair of the first partition walls 84, and one pair of the second small projections 88. The micro cassette 60 removably held by the holding means 78 in this manner crosses the first horizontal face 16 of the accessory 10 substantially at right angles thereto.

In this embodiment, the micro cassette 60 inserted in the cavity of the holding means 78 can also be removably held between the other first small projection 82, a pair of the second partition walls 86, and the other pair of the second small projections 88.

The hold of the micro cassette between the one first small projection 82, the pair of first partition walls 84, and the one pair of second small projections 88, or between the other first small projection 82, the pair of second partition walls 86, and the other pair of second small projections 88 will diminish the frictional force produced between the surface of the micro cassette 60 and the inner peripheral surface of the holding means 78, thereby facilitating attachment and detachment of the micro cassette 60 to and from the holding means 78.

Referring now to FIGS. 13 to 15, there will be described a third embodiment of the invention. In the description to follow, like reference numerals used in conjunction with the first and second embodiments refer to like portions throughout the drawings.

As shown in FIGS. 13 and 14, an accessory 10 according to the third embodiment has a holding means 78 defined in a first horizontal face 16 and a pair of additional second engaging means 22 on a second horizontal face 18.

Like the holding means 78 of the accessory 10 of the second embodiment shown in FIG. 12, the holding means 78 of the accessory 10 of the third embodiment may removably hold the micro cassette 60.

Further, the pair of additional second engaging means 22 formed on the second horizontal face 18 of the accessory 10 of the third embodiment may be fitted with a first engaging means 20 of a third tape cassette storage box 58, as shown in FIG. 15, by following the aforementioned step.

Referring now to FIGS. 16 to 20, there will be described a fourth embodiment of the invention. In the description to follow, like reference numerals used in conjunction with the first embodiment refer to like portions throughout the drawings.

Figure 16:
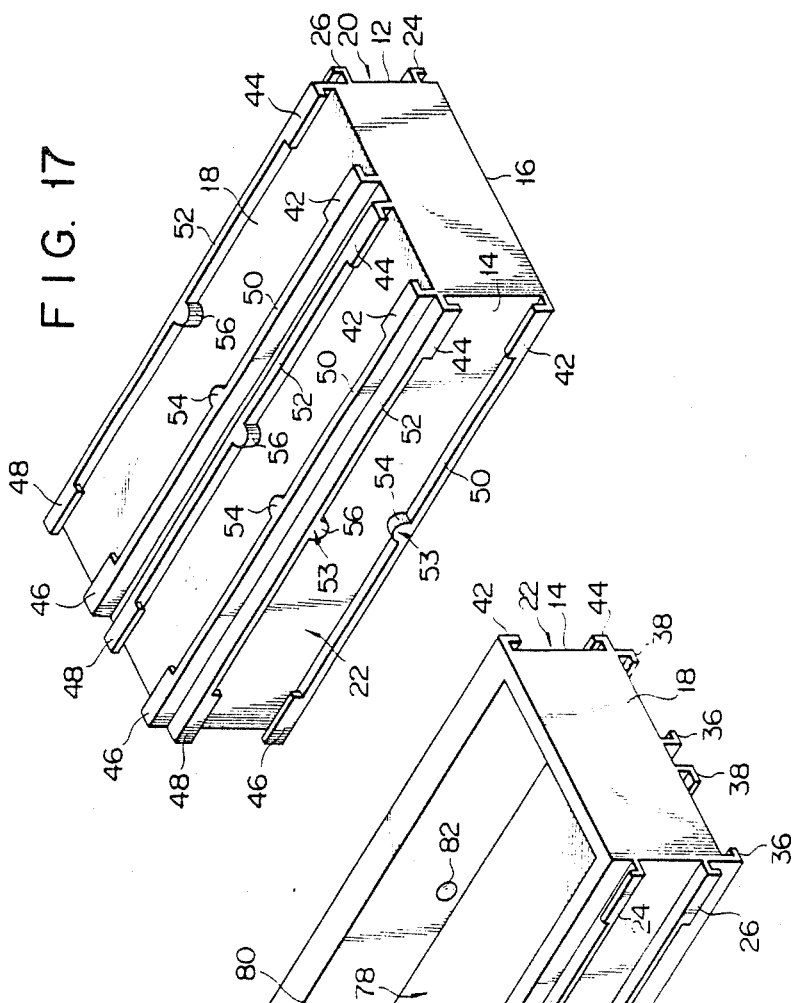
FIG. 16 is a perspective view showing another example of the first engaging means.

In this fourth embodiment, as shown in FIG. 16, a first guide plate 32 is connected with first and third engaging clicks 24 and 28, and a second guide plate 34 is connected with second and fourth engaging clicks 26 and 30.

An engaging member 90 is formed on the lower surface of the second guide plate 34, lying halfway between the front and rear ends of a first lateral face 12.

The engaging member 90 includes a pair of engaging projections 92 and 94 arranged along the longitudinal direction of the first lateral face 12.

Figure 18:
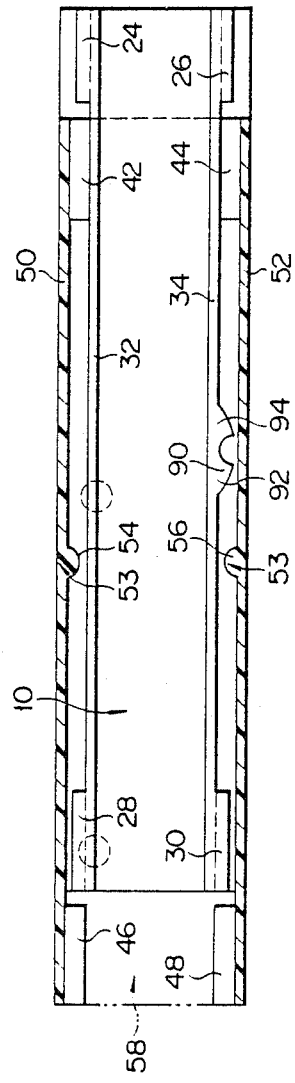
FIG. 18 is a sectional side view of the tape cassette storage box showing a state immediately before the second engaging means of the storage box shown in FIG. 17 engages the first engaging means of the tape cassette storage box coupling accessory shown in FIG. 16.
Figure 19:
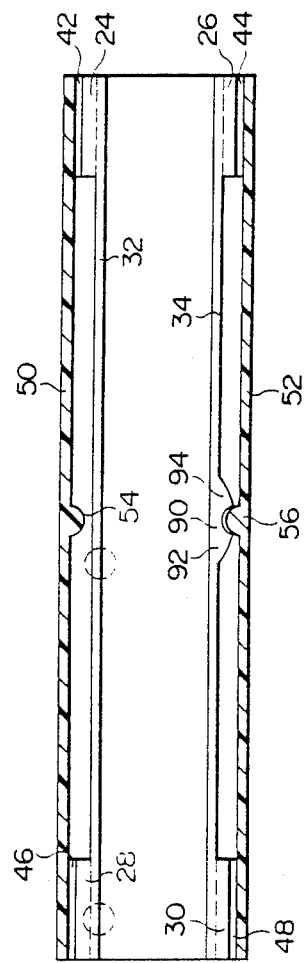
FIG. 19 is a sectional side view of the tape cassette storage box showing a state after the second engaging means of the storage box shown in FIG. 17 has engaged the first engaging means of the tape cassette storage box coupling accessory shown in FIG. 16.

As in the case of the first embodiment, a first engaging means 20 of an accessory 10 according to the fourth embodiment may be fitted with a second engaging means 22 of a tape cassette storage box 58 by following the steps shown in FIGS. 18 and 19 in order. At this time, as shown in FIG. 19, a second engaged projection 56 of the second engaging means 22 of the storage box 58 is in contact with the pair of engaging projections 92 and 94 of the engaging member 90 of the first engaging means 20, lying halfway between them.

Also, a second engaging means 22 of the accessory may be fitted with a first engaging means 20 of another tape cassette storage box 58 in the aforementioned manner.

The distance L between a left-hand lateral face 66 of a left-hand tape cassette storage box 58 and a right-hand lateral face 68 of a right-hand tape cassette storage box 58 coupled with the accessory, as shown in FIG. 20, is substantially equal to the longitudinal length l of the compact cassette 70 shown in FIG. 6, that is, approximately 102 mm.

As shown in FIG. 20, the upper surface or a first horizontal face 16 and the lower surface or a second horizontal face 18 of an accessory body 11 are arranged flush with the respective upper and lower surfaces of the two tape cassette storage boxes 58 coupled with the accessory, respectively.

When an external force exceeding a given level is applied to each of the two tape cassette storage boxes 58 coupled with the accessory 10 as shown in FIG. 20, the second engaged projection 56 of an engaged device 53 of the second engaging means 22 elastically deforms one of the engaging projections of the engaging member 90 of the first engaging means 20 in the downward direction. Then, the engagement between the engaging member 90 of the first engaging means 20 and the second engaged projection 56 of the engaged device 53 of the second engaging means 22 is removed to allow the two tape cassette storage boxes 58 to be moved along the first and second lateral faces 12 and 14 of the accessory 10 in the longitudinal direction thereof. Thus, each of the two tape cassette storage boxes 58 moved relatively to the accessory 10 in the longitudinal direction thereof can be released from the coupling with the accessory 10, as shown in FIG. 18, after going through the aforesaid processes inversely.

A tape cassette storage box coupling accessory according to this invention is intended to be coupled with a tape cassette storage box 58 which comprises a storage box body 62 for holding a micro cassette 60, a cover 64 coupled with the storage box body 62 so as to be able to rotate between a first position in which the cover 64 houses, in cooperation with the storage box body 62, the micro cassette 60 held in the storage box body 62 and a second position in which the cover 64 allows the micro cassette 60 to be removed from the storage box body 62, a first engaging means 20 formed on one 66 of two lateral faces of the storage box body 62 intersecting the axis of rotation of the cover 64, and a second engaging means 22 formed on the other 68 of the two lateral faces, and comprises a first lateral face 12 having a first engaging means 20 formed thereon, and a second lateral face 14 disposed in parallel with the first lateral face 12 and having a second engaging means 22 formed thereon, the improvement in which the distance between the first and second lateral faces 12, 14 is set so that the distance between the one lateral face 66 of a first tape cassette storage box 58 and the other lateral face 68 of a second tape cassette storage box 58 is substantially equal to the longitudinal length of a compact tape cassette when the second engaging means 22 of the other lateral face 68 of the first tape cassette storage box 58 and the first engaging means 20 of the one lateral face 66 of the second tape cassette storage box 58 are engaged with the first engaging means 20 of the first lateral face 12 and the second engaging means 22 of the second lateral face 14 of the accessory, respectively.

With such arrangement, the tape cassette storage boxes for micro cassettes, like compact cassettes, can attract consumers' attention with ease when they are displayed in stores for sale. As a result, the micro cassette storage boxes, as well as micro cassettes contained therein, may enjoy increased opportunities of sale.

Preferably, the tape cassette storage box coupling accessory of the invention further comprises first and second faces 16, 18 connected with the first and second lateral faces 12, 14 and isolated from each other, at least one of the first and second faces 16, 18 including a holding means 78 for removably holding the micro cassette 60 in a position to intersect the first and second faces 16, 18.

With such arrangement, the micro cassettes may be displayed in various styles in stores, and the micro cassette storage boxes may make a stronger impression on consumers than compact cassettes may.

In the tape cassette storage box coupling accessory of the invention, the holding means 78 preferably includes a cavity being defined by an inner peripheral surface 80 to hold at least part of the surface of the micro cassette 60.

With such arrangement, the holding means may be simplified in construction. Thus, it is possible to reduce the manufacturing cost of the holding means, and hence of the tape cassette storage box coupling accessory.

Alternatively, the tape cassette storage box coupling accessory of the invention may further comprises first and second faces 16, 18 connected with the first and second lateral faces 12, 14 and isolated from each other, the first face 16 including a holding means 78 for removably holding the micro cassette 60 in a position to intersect the first and second faces 16, 18, and the second face 18 including at least one of the first and second engaging means 20, 22.

With such arrangement, the tape cassette storage boxes containing micro cassettes may be displayed in various styles in stores, and may make a stronger impression on consumers than compact cassettes may.

Preferably, the tape cassette storage box coupling accessory of the invention further comprises first and second faces 16, 18 connected with the first and second lateral faces 12, 14 and isolated from each other, at least one of the first and second faces 16, 18 including at least one of the first and second engaging means 20, 22.

With such arrangement, the tape cassette storage boxes containing micro cassettes may be displayed in various styles in stores, and may make a stronger impression on consumers than compact cassettes may.

Preferably, in the tape cassette storage box coupling accessory of the invention, the first and second faces 16, 18 are disposed in parallel with each other and at right angles to the first and second lateral faces 12, 14, and are located flush with the surfaces of the first and second tape cassette storage boxes 58 when the accessory is coupled with the cassette storage boxes 58.

With such arrangement, the two tape cassette storage boxes coupled with the tape cassette box coupling accessory may be adapted for use with a wide variety of cassette racks commercially available for the classification or rearrangement of Philips-type compact tape cassettes.

Preferably, in the tape cassette storage box coupling accessory of the invention, each of the first and second lateral faces 12, 14 has a rectangular shape, the first engaging means includes first to fourth engaging clicks 24, 26, 28, 30 formed in the four corners of the first lateral face 12 and having the same length and the same direction for engagement, a first guide plate 32 formed between the first engaging click 24 and the third engaging click 28 located in the direction of the engaging length of the first engaging click 24 and guiding to engage with the first or third engaging click 24, 28, and a second guide plate 34 formed between the second engaging click 26 located in a direction to cross the direction of the engaging length of the first engaging click 24 and the fourth engaging click 30 located in the direction of the engaging length of the second engaging click 26 and guiding to engage with the second or fourth engaging click 26, 30, and the second engaging means 22 includes first to fourth engaged clicks 42, 44, 46, 48 formed in the four corners of the second lateral face 14 and having the same length and the same direction for engagement, a third guide plate 50 formed between the first engaged click 42 and the third engaged click 46 located in the direction of the engaging length of the first engaged click 42 and guiding to engage with the first or third engaged click 42, 46, and a fourth guide plate 52 formed between the second engaged click 44 located in a direction to cross the direction of the engaging length of the first engaged click 42 and the fourth engaged click 48 located in the direction of the engaging length of the second engaged click 44 and guiding to engage with the second or fourth engaged click 44, 48.

With such arrangement, it is possible to simplify the operating steps of coupling the first engaging means of the accessory with the second engaging means of one tape cassette storage box, coupling the second engaging means of the accessory with the first engaging means of another tape cassette storage box, removing the coupling between the first engaging means of the accessory and the second engaging means of the one tape cassette storage box, and removing the coupling between the second engaging means of the accessory and the first engaging means of the other tape cassette storage box.

Preferably, in the tape cassette storage box coupling accessory of the invention, the first and second lateral faces 12, 14 and the first and second engaging means 20, 22 are integrally formed out of a plastic material with elasticity by injection molding.

With such arrangement, the manufacturing processes for the tape cassette storage box coupling accessory can be simplified to lower the manufacturing cost.

Preferably, in the tape cassette storage box coupling accessory of the invention, the first to fourth engaging clicks 24, 26, 28, 30 of the first engaging means 20 and the first and second guide plates 32, 34 are isolated from one another, the first and third engaging clicks 24, 28 of the first engaging means 20 protrude from the first lateral face 12 substantially at right angles thereto with the projected ends thereof bent away from the second and fourth engaging clicks 26, 30 along a direction substantially parallel with the first lateral face 12, the second and fourth engaging clicks 26, 30 of the first engaging means 20 protrude from the first lateral face 12 substantially at right angles thereto with the projected ends thereof bent away from the first and third engaging clicks 24, 30 along the direction substantially parallel with the first lateral face 12, the first and third engaged clicks 42, 46 of the second engaging means 22 protrude from the second lateral face 14 substantially at right angles thereto with the projected ends thereof bent toward the second and fourth engaged clicks 44, 48 along a direction substantially parallel with the second lateral face 14, the second and fourth engaged clicks 44, 48 of the second engaging means 22 protrude from the second lateral face 14 substantially at right angles thereto with the projected ends thereof bent toward the first and third engaged clicks 42, 46 along the direction substantially parallel with the second lateral face 14, and the respective projected ends of the first to fourth engaging clicks 24, 26, 28, 30 of the first engaging means 20 and the first to fourth engaged clicks 42, 44, 46, 48 of the second engaging means 22 have chamfer portions 72 formed along their respective directions for engagement, so that the respective chamfer portions 72 of the first to fourth engaged clicks 42, 44, 46, 48 of the second engaging means 22 of the tape cassette storage box 58 is brought into contact with the respective chamfer portions 72 of the first to fourth engaging clicks 24, 26, 28, 30 of the first engaging means of the accessory when the second engaging means 22 of the tape cassette storage box 58 is brought into contact with the first engaging means 20 of the accessory along a direction to cross the engaging direction of the first engaging means 20.

With such arrangement, the first to fourth engaging clicks of the first engaging means of the tape cassette storage box coupling accessory can be coupled with the first to fourth engaged clicks of the second engaging means of the tape cassette storage box by bringing the second engaging means of the tape cassette storage box into contact with the first engaging means of the accessory along the direction to cross the engaging direction of the first engaging means. On the other hand, such coupling can be removed by moving the tape cassette storage box and the accessory away from each other along the direction to cross the engaging direction of the first engaging means.

Preferably, in the tape cassette storage box coupling accessory of the invention, at least one of the first and second guide plate 32, 34 of the first engaging means 20 includes an engaging device 35, and at least one of the third and fourth guide plates 50, 52 of the second engaging means 22 includes an engaged device 53, so that the engaging device 34 of the first engaging means 20 engages the engaged device 53 of the second engaging means 22 to maintain the engagement between the first engaging means 20 of the accessory and the second engaging means 22 of the tape cassette storage box 58 until an external force exceeding a given level is applied to the accessory and the tape cassette storage box 58 when the first to fourth engaged clicks 42, 44, 46, 48 of the second engaging means 22 get engaged with the first to fourth engaging clicks 24, 26, 28, 30 of the first engaging means 20.

With such arrangement, the engagement between the first engaging means of the tape cassette storage box coupling accessory and the second engaging means of the one tape cassette storage box and between the second engaging means of the accessory and the first engaging means of the other tape cassette storage box can securely be maintained against the external force not exceeding the given level.

Preferably, in the tape cassette storage box coupling accessory of the invention, the first and third engaged clicks 42, 46 and the third guide plate 50 of the second engaging means 22 are connected with one another, and the second and fourth engaged clicks 44, 48 and the fourth guide plate 52 of the second engaging means 22 are connected with one another and isolated from said first and third engaged clicks 42, 46 and the third guide plate 50, the engaging device 35 of the first engaging means 20 includes openings 36 formed severally in the central regions of the first and second guide plates 32, 34 along the direction for guidance thereof, whereby the central regions are isolated from the first lateral face 12, a first stopper 38 formed in the central region of the first guide plate 32 nearer to the first engaging click 24 than to the third engaging click 28 and projecting in the same direction with the projected end portions of the first and third engaging clicks 24, 28, and a second stopper 40 formed in the central region of the second guide plate 34 nearer to the fourth engaging click 30 than to the second engaging click 26 and projecting in the same direction with the projected end portions of the second and fourth engaging clicks 26, 30, and the engaged device 53 of the second engaging means 22 includes a first engaged projection 54 formed in the central region of the third guide plate 50 along the direction for guidance thereof and projecting in the same direction with the projected end portions of the first and third engaged clicks 42, 46, and a second engaged projection 56 formed in the central region of the fourth guide plate 52 along the direction for guidance thereof and projecting in the same direction with the projected end portions of the second and fourth engaged clicks 44, 48, so that the first and second engaged projections 54, 56 of the second engaging means 22 of the tape cassette storage box abut against the first and second stoppers 38, 40 of the first engaging means 20 of the accessory, respectively, to maintain the engagement between the first engaging means 20 of the accessory and the second engaging means 22 of the tape cassette storage box until an external force exceeding the given level is applied to the accessory and the tape cassette storage box when the first to fourth engaged clicks 42, 44, 46, 48 of the second engaging means 22 get engaged with the first to fourth engaging clicks 24, 26, 28, 30 of the first engaging means 20.

With such arrangement, the engaging device 35 and the engaged device 53 may be simplified in construction to ensure smooth and reliable reciprocal operations.

In the tape cassette storage box coupling accessory of the invention, the first and second engaged projections 54, 56 of the second engaging means 22 are preferably hollow.

With such arrangement, the reciprocal operations of the engaging device 35 and the engaged device 53 may be performed more smoothly with improved reliability.

Alternatively, the tape cassette storage box coupling accessory of the invention may be so constructed that the first and third engaging clicks 24, 28 and the first guide plate 32 of the first engaging means 20 are connected with one another, the second and fourth engaging clicks 26, 30 and the second guide plate 34 of the first engaging means 20 are connected with one another and isolated from the first and third engaging clicks 24, 28 and the first guide plate 32, the first and third engaged clicks 42, 46 and the third guide plate 50 of the second engaging means 22 are connected with one another, the second and fourth engaged clicks 44, 48 and the fourth guide plate 52 of the second engaging means 22 are connected with one another and isolated from the first and third engaged clicks 42, 46 and the third guide plate 50, an engaging member 90 is formed in the central region of at least one of the first and second guide plates 32, 34 along the direction for guidance thereof, and first and second engaged projections 54, 56 are formed in the central regions of the third and fourth guide plates 50, 52 along the direction for guidance thereof, respectively, so that one of the first and second engaged projections 54, 56 of the second engaging means 22 of the tape cassette storage box gets engaged with the engaging member 90 of the first engaging means 20 of the accessory to maintain the engagement between the first engaging means 20 of the accessory and the second engaging means 22 of the tape cassette storage box until an external force exceeding a given level is applied to the accessory and the tape cassette storage box when the first to fourth engaged clicks 42, 44, 46, 48 of the second engaging means 22 get engaged with the first to fourth engaging clicks 24, 26, 28, 30 of the first engaging means 20.

With such arrangement, the engaging device 35 and the engaged device 53 may be simplified in construction to ensure reliable reciprocal operations.

Moreover, the tape cassette storage box coupling accessory of the invention may be so constructed that the engaging member 90 of the first engaging means 20 includes a pair of engaging projections 92, 94 arranged along the guiding direction of the first and second guide plates 32, 34, so that one of the first and second engaged projections 54, 56 of the second engaging means 22 of the tape cassette storage box engaged with the engaging member 90 of the first engaging means 20 of the accessory comes in contact with the pair of engaging projections 92, 94, lying between the engaging projections 92, 94.

With such arrangement, the engaging member 90 may be simplified in construction to ensure reliable operations.

What we claim is:

1. A tape cassette storage box coupling accessory to be coupled between first and second tape cassette storage boxes each of which comprises a storage box body for holding a micro cassette, the storage box body having first and second substantially rectangular parallel lateral faces; a cover rotatably coupled with said storage box body so as to be rotatable between a first position in which said cover houses, in cooperation with said storage box body, a micro cassette held in said storage box body and a second position in which said cover is in a position which allows said micro cassette to be removed from said storage box body; a first engaging means formed on the first parallel lateral face said storage box body, said first lateral face and said first engaging means being integrally formed of a plastic material having elasticity; and a second engaging means formed on the second parallel lateral face of said storage box body, said second lateral face and said second engaging means being integrally formed of a plastic material having elasticity;

the coupling accessory comprising:

an accessory body;

a first substantially rectangular lateral face on said acccessory body and having the same dimensions as that of the parallel lateral faces of the storage box body, said first lateral face of said accessory body comprising a first engaging means integrally formed therewith of a plastic material having elasticity and which is the same as said first engaging means of the storage box body; and a second substantially rectangular lateral face on said accessory body which is substantially parallel to said first lateral face of said accessory body, said second lateral face of said accessory body extending in the same longitudinal direction as said first lateral face of said accessory body and having the same dimensions as said first lateral face of said accessory body, and said second lateral face of said accessory body comprising a second engaging means integrally formed therewith of a plastic material having elasticity and which is the same as said second engaging means of the storage body;

said accessory body having a width between said first and second lateral faces thereof such that the distance between said first and second lateral faces thereof is such that the distance from the first parallel lateral face of a first tape cassette storage box body to the second parallel face of a second tape cassette storage box is substantially equal to the longitudinal length of a conpact-type tape cassette storage box when the second engaging means on said second lateral face of the first tape cassette storage box and the first engaging means on said first lateral face of the second tape cassette storage box are coupled respectively to the first engaging means on said first lateral face of said accessory body and the second engaging means on said second lateral face of said accessory body to thereby connect said accessory body between the first and second tape cassette storage boxes;

said first engaging means of said storage box body and of said accessory body including first to fourth click-type engaging means formed in the four corners of said first lateral face and having the same length and the same direction for engagement, a first guide plate formed between the first click-type engaging means and the third click-type engaging means and extending in the direction of the engaging length of said first click-type engaging means and guiding to engage with said first or third click-type engaging means, and a second guide plate formed between the second click-type engaging means located in a direction to cross the direction or the engaging length of said first click-type engaging means and the fourth click-type engaging means located in the direction of the engaging length of said second click-type engaging means and guiding to engage with said second or fourth click-type engaging means;

said second engaging means of said storage box body and of said accessory body including first to fourth click-type engageable means formed in the four corners of said second lateral face and having the same length and the same direction for engagement, a third guide plate formed between the first click-type engageable means and the third click-type engageable means located in the direction of the engaging length of said first click-type engageable means, whereby said first or third click-type engageable means is guided in engagement, and a fourth guide plate formed between the second click-type engageable means located in a direction to cross the direction of the engaging length of said first click-type engageable means and the fourth click-type means located in the direction of the engaging length of said second click-type engageable means, whereby said second or fourth engaged click is guided in engagement;

said first to fourth click-type engaging means of said first engaging means and said first and second guide plates being isolated from one another;

said first and third click-type engaging means of said first engaging means protruding from said first lateral face substantially at right angles thereto and having projecting ends thereof bent away from said second and fourth click-type engaging means along a direction substantially parallel with said first lateral face;

said second and fourth click-type engaging means of said first engaging means protruding from said first lateral face substantially at right angles thereto and having projecting ends thereof bent away from said first and third click-type engaging means along a direction substantially parallel with said first lateral face;

said first and third click-type engageable means of said second engaging means protruding from said second lateral face substantially at right angles thereto and having projecting ends thereof bent toward said second and fourth click-type engageable means along a direction substantially parallel with said second lateral face;

said second and fourth click-type engageable means of said second engaging means protruding from said second lateral face substantially at right angles thereto and having projecting ends thereof bent toward said first and third click-type engageable means along a direction substantially parallel with said second lateral face; and the respective projecting ends of said first to fourth click-type engaging means of said first engaging means and said first to fourth click-type engageable means of said second engaging means having chamfer portions formed along their respective directions for engagement, so that respective chamfer portions of said first to fourth click-type engageable means of said second engaging means of the tape cassette storage box are brought into contact with the respective chamfer portions of said first to fourth click-type engaging means of said first engaging means of said accessory when said second engaging means of said tape cassette storage box is brought into contact with said first engaging means of said accessory along a direction to cross the engaging direction of said first engaging means;

said accessory body having substantially flat upper and lower faces which are substantially parallel with each other and which are substantially coplanar with upper and lower faces of the first and second tape cassette storage boxes when connected together and when the covers of the first and second tape cassette storage boxes are in said first position;

said upper face of said accessory body including a holding means for removably holding a micro cassette in a position such that substantially flat upper and lower surfaces of the micro cassette intersect said upper and lower faces of said accessory body;

said lower face of said accessory body including at least one of said first and second engaging means; and said holding means including a cavity formed in said upper face of said accessory body and having partition walls for holding a plurality of micro cassettes, and projections for making point contact against the insertion and departing of the micro cassettes in the cavity, the depth of said cavity being so determined that a relatively large part of the outer surface of each of said micro cassettes is projected out from said cavity.

2. A tape cassette storage box coupling accessory according to claim 1, wherein at least one of the first and second guide plates of said first engaging means includes an engaging device; and at least one of the third and fourth guide plates of said second engaging means includes an engageable device; the engaging device of said first engaging means engaging the engageable device of said second engaging means to maintain the engagement between the first engaging means of said accessory and the second engaging means of the tape cassette storage box until an external force exceeding a given level is applied to said accessory and said tape cassette storage box when the first to fourth click-type engageable means of said second engaging means engage with the first to fourth click-type engaging means of said first engaging means.

3. A tape cassette storage box coupling accessory according to claim 2, wherein the first and third click-type engageable means and the third guide plate of said second engaging means are connected with one another; and the second and fourth click-type engageable means and the fourth guide plate of said second engaging means are connected with one another and isolated from said first and third click-type engageable means and said third guide plate; the engaging device of said first engaging means includes openings formed severally in the central regions of said first and second guide plates along the direction for guidance thereof, whereby said central regions are isolated from said first lateral face, a first stopper formed in the central region of said first guide plate nearer to said first click-type engaging means than to said third click-type engaging means and projecting in the same direction as the projecting end portions of said first and third click-type engaging means, and a second stopper formed in the central region of said second guide plate nearer to said fourth click-type engaging means than to said second click-type engaging means and projecting in the same direction as the projecting end portions of said second and fourth click-type engaging means; and the engageable device of said second engaging means includes a first engageable projection formed in the central region of said third guide plate along the direction for guidance thereof and projecting in the same direction as the projecting end portions of said first and third click-type engageable means, and a second engageable projection formed in the central region of said fourth guide plate along the direction for guidance thereof and projecting in the same direction as the projecting end portions of said second and fourth click-type engageable means, so that first and second engageable projections of said second engaging means of the tape cassette storage box abut against the first and second stoppers of said first engaging means of said accessory, respectively, to maintain engagement between the first engaging means of said accessory and the second engaging means of the tape cassette storage box until an external force exceeding said given level is applied to said accessory and said tape cassette storage box when the first to fourth click-type engageable means of said engaging means are engaged with the first to fourth click-type engaging means of said first engaging means.

4. A tape cassette storage box coupling accessory according to claim 2, wherein the first and second engageable projections of said engageable device of said second engaging means are hollow.

5. A tape cassette storage box coupling accessory according to claim 1, wherein the first and third click-type engaging means and the first guide plate of said first engaging means are connected with one another; the second and fourth click-type engaging means and the second guide plate of said first engaging means are connected with one another and isolated from said first and third click-type engaging means and said first guide plate; the first and third click-type engaging means and the third guide plate of said second engaging means are connected with one another; the second and fourth click-type engageable means and the fourth guide plate of said second engaging means are connected with one another and isolated from said first and third click-type engageable means and said third guide plate; an engaging member is formed in the central region of at least one of said first and second guide plates along the direction for guidance thereof; and first and second engageable projections are formed in the central regions of said third and fourth guide plates along the direction for guidance thereof, respectively, so that one of first and second engageable projections of said second engaging means of the tape cassette storage box is engageable with the engaging member of said first engaging means of said accessory to maintain engagement between the first engaging means of said accessory and the second engaging means of the tape cassette storage box until an external force exceeding a given level is applied to said accessory and to said tape cassette storage box when the first to fourth click-type engageable means of said second engaging means are engaged with the first to fourth click-type engaging means of said first engaging means.

6. A tape cassette storage box coupling accessory according to claim 5, wherein said engaging member includes a pair of engaging projections arranged along the guiding direction of said first and second guide plates, so that one of the first and second engageable projections comes in contact with the pair of engageable projections, lying between said engageable projections.

* * * * *

UNITED STATES PATENT AND TRADEMARK OFFICE
CERTIFICATE OF CORRECTION

PATENT NO. : 4,523,680
DATED : June 18, 1985
INVENTOR(S) : SAITO et al

It is certified that error appears in the above-identified patent and that said Letters Patent is hereby corrected as shown below:

In the Foreign Application Priority Data:

The correct number of the basic Japanese Patent Application is 55-160967.

Column 18 (claim 4), line 2, the dependency of the claim should be changed from "claim 2" to --claim 3--.

Signed and Sealed this

Twenty-fourth Day of December 1985

[SEAL]

Attest:

DONALD J. QUIGG

Attesting Officer

Commissioner of Patents and Trademarks